Patented Mar. 16, 1926.

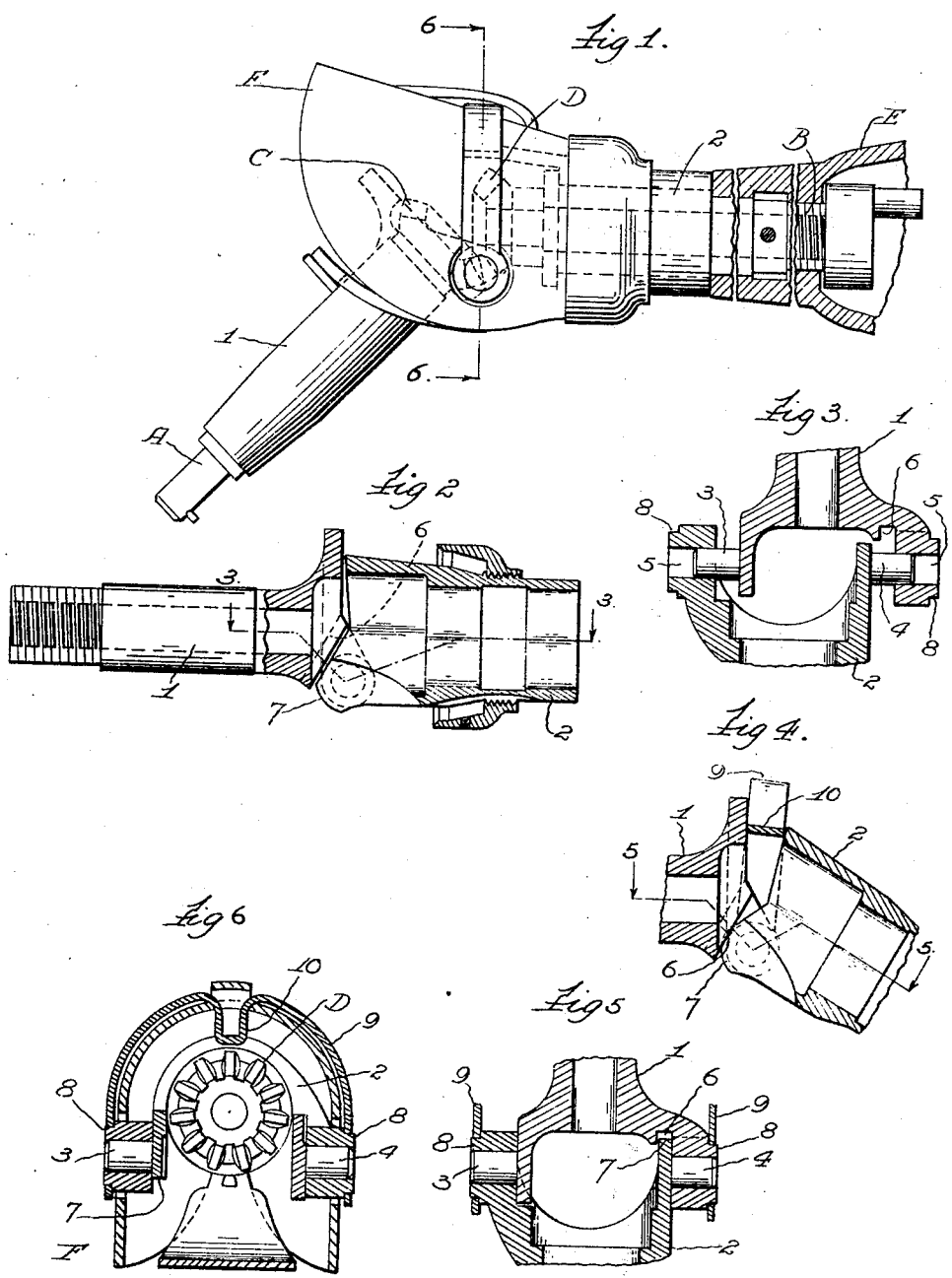

1,576,773

UNITED STATES PATENT OFFICE.

MICHAEL W. McARDLE, OF CHICAGO, AND HORACE C. WRIGHT, OF OAK PARK, ILLINOIS, ASSIGNORS TO CHICAGO FLEXIBLE SHAFT COMPANY, A CORPORATION OF ILLINOIS.

JOINTED DRIVE SHAFT.

Application filed November 14, 1925. Serial No. 68,983.

*To all whom it may concern:*

Be it known that we, MICHAEL W. McARDLE and HORACE C. WRIGHT, both citizens of the United States, the former having residence in Chicago, Illinois, and the latter having residence at 929 Fair Oaks Avenue, Oak Park, Illinois, have invented certain new and useful Improvements in Jointed Drive Shafts, of which the following is a specification, reference being had to the accompanying drawings, forming a part thereof.

This invention relates to an improved construction for the shaft casing of a flexible drive, such as that commonly employed for horse clippers, sheep shears and some other portable tools. The purpose of the invention is to simplify the construction and it consists of certain features and elements in combination, as herein described and shown and as indicated by the claims.

In the drawings:

Figure 1 is a side elevation of a jointed shaft drive embodying this invention, showing in section a portion of the tool to be operated.

Figure 2 is a substantially axial section of the two-part casing for the drive.

Figure 3 is a detail section taken as indicated at line 3—3, on Figure 2.

Figure 4 is an axial section taken at the same plane as Figure 2, but showing the parts in a different angular relation to each other.

Figure 5 is a detail section taken as indicated at the line 5—5, on Fig. 4.

Figure 6 is a transverse section as indicated at the line 6—6, on Fig. 1.

In the type of jointed drive to which this invention applies, the power shaft includes two shaft members, A and B, which are operatively engaged with each other by means of crown gears indicated at C and D in Fig. 1, the gear, D, being shown in full lines in Fig. 6. The shafts, A and B, are respectively journaled in the members, 1 and 2 of a two-part casing, these parts being hinged together to permit of altering the angular relation between the shafts, A and B, through a certain range, and the gears, C and D, being so cut as to remain in mesh throughout this range for transmitting the driving power. Fig. 1 indicates a portion, E, of the housing of a tool such as a horse clipper which is to be driven by the shaft, B. In Fig. 1 the gears, C and D, are enclosed by a leather sheath, F, within which the angular movement of the part, 1, with respect to the part, 2, takes place.

The casing parts, 1 and 2, which provide journal bearings for the shafts, A and B, are connected by hinge pintles, 3 and 4, each of which is fixed to one of said parts, and each of which engages a socket or bearing, 5, on the other part. Thus, as indicated in Fig. 3, the parts, 1 and 2, are engaged or disengaged with each other by longitudinal sliding movement of the pintles, 3 and 4, with respect to the bearings, 5, along the axis of the hinge connection.

However, the part, 1, is formed with a groove, 6, and the part, 2, has a projecting rib, 7, which is adapted to inter-member with the groove, 6, throughout most of the angular range of movement of the hinged parts. When said parts are brought into substantial alignment, as shown in Fig. 2, the rib, 7, emerges completely from the groove, 6, and permits the parts to be slid laterally with respect to each other for disengaging the hinge pintles, 3 and 4, from the bearings, 5, as indicated in Fig. 3.

By virtue of this construction the parts are readily assembled or taken apart for the purpose of repair, but for normal use, it is desirable to prevent them from slipping apart or tending to move with respect to each other along the hinge axis. The outer lateral surface of each of the casing parts is formed with a boss, 8, concentric with respect to the hinge axis, and a yoke, 9, of flat spring metal is snapped over the connected parts with its apertured ends engaging these bosses, 8, as shown in Fig. 6. This yoke would yieldingly tend to prevent disengagement of the parts, but a more positive lock is afforded by bending down the middle portion of the yoke at 10 so that it is intruded between the opposed upper edges of the parts, 1 and 2, above their hinge axes, and prevents the parts from swinging into the axially aligned position shown in Fig. 2. The width of the flat stock of the yoke, 9, is sufficient to block the parts, 1 and 2 at such angular relation to each other as to prevent the rib, 7, moving out of the groove, 6. This is clearly shown in Fig. 4. Thus to accomplish the disengagement of the parts, 1 and 2, it is first necessary to pry off the spring yoke, 9, from the bosses, 8, and withdraw its pendant middle portion, 10, from between the parts, 1 and 2, so that they may be swung together into aligned position. This definitely prevents any accidental disengagement of the casing parts while the tool is in use.

We claim:—

1. A casing for a jointed power shaft comprising two parts hinged together and separable by axial movement of one part with respect to the other, said parts having inter-membering features which prevent such axial separation through a portion of the angular range of positions permitted by the hinged connection, said features being disengageable only when the hinged parts are substantially aligned and a yoke attached by its ends at the hinge axis, and having a portion interposed between the two members to block them apart and prevent their alignment.

2. In the combination defined in claim 1, said yoke being formed of flat spring stock bent upon itself to provide a depending middle portion interposed between the two casing members.

3. A casing for a jointed power shaft comprising two parts hinged together and separable by axial movement of one part with respect to the other, said parts having inter-membering features which prevent such separation through a part of the angular range of hinge movement, said features being disengageable when the parts are substantially aligned, and a yoke removably attached to the casing with means supported by said yoke interposed between the two members at a distance from the hinge axis to prevent their alignment.

4. In the combination defined in claim 3, said casing having circular bosses laterally disposed and concentric about the hinge axis, and the yoke having spring arms apertured at their ends to engage said bosses.

In testimony whereof, we have hereunto set our hands at Chicago, Illinois, this 11th day of November, 1925.

MICHAEL W. McARDLE.
HORACE C. WRIGHT.